United States Patent [19]

Neuland

[11] Patent Number: 5,603,739
[45] Date of Patent: Feb. 18, 1997

[54] ABRASIVE SUSPENSION SYSTEM

[75] Inventor: Edward J. Neuland, Houston, Tex.

[73] Assignee: Diamond Scientific, Inc., Houston, Tex.

[21] Appl. No.: 488,513

[22] Filed: Jun. 9, 1995

[51] Int. Cl.$^6$ .................................................. B24D 3/34
[52] U.S. Cl. ........................... 51/298; 51/307; 106/3; 252/79.1
[58] Field of Search .......................... 51/298, 307, 293; 106/3; 252/79.1

[56] References Cited

U.S. PATENT DOCUMENTS

| | | | |
|---|---|---|---|
| 4,889,712 | 12/1989 | Gaffar et al. | 424/52 |
| 4,992,256 | 2/1991 | Skaggs et al. | 424/7.1 |
| 5,334,375 | 8/1994 | Nabi et al. | 424/52 |
| 5,385,729 | 1/1995 | Prencipe et al. | 424/70.11 |

*Primary Examiner*—Deborah Jones
*Attorney, Agent, or Firm*—Bardehle, Pagenberg, Dost, Altenburg, Frohwitter, Geissler and Partners

[57] ABSTRACT

The invention is directed to an abrasive composition comprising an abrasive component in a liquid base component and methods of making the same. More specifically, the present invention is directed to an abrasive composition comprising water, an alcohol, a surfactant, polymer, and an abrasive and methods of making the same.

15 Claims, No Drawings

ABRASIVE SUSPENSION SYSTEM

FIELD OF INVENTION

The invention relates to abrasives and more particularly to abrasive compositions comprised of particles in a liquid medium.

BACKGROUND OF THE INVENTION

Abrasive compositions used for finishing processes, including polishing and lapping, generally have consisted of particles dispersed in a liquid. Diamonds have long been used as the abrasive particles in such compositions because of their hardness. Generally, the abrasive compositions have been in the form of slurries wherein the diamonds formed a discontinuous phase and, e.g., a hydrocarbon-based liquid, formed the continuous phase. For example, a common abrasive material such as that generally described above consists of diamonds, naptha, mineral oil, ethylene glycol, coolants or machine oil, and water.

The problem with the above-identified compositions is that the diamonds and/or abrasive particles tend to settle out of the liquid base and form cakes. This "caking" is often in the form of an agglomeration of particles which may scratch the pieces on which the abrasive material is later applied. Consequently, in order to avoid this problem, these abrasive materials must be constantly stirred and/or mixed when in use. In addition, another disadvantage of the above-identified compositions is the fact that these abrasive compositions generally utilize liquid bases containing hydrocarbons, which are by nature insoluble in water and may be hazardous materials and/or at least require special disposal procedures.

The present invention solves the above-identified problems by utilizing a water soluble liquid base as the continuous phase and the uniformly dispersed abrasive particles as the discontinuous phase. More importantly, the abrasive particles in the present invention do not fall out of suspension and thus, do not agglomerate. As a result, the present invention can be applied to equipment and/or other surfaces requiring polishing or lapping by spray, pump, or even gravity delivery systems with no mixing or stirring of any kind. Further, due to the durable suspension of the particles, consumers can purchase the product and store it for extended periods of time without having the abrasive particles cake at the bottom of the container and thus without the need to mix or stir the abrasive prior to use.

Moreover, since the present invention is water soluble, work pieces and any equipment used in finishing processes can be cleaned with soap and water and operators are subjected to fewer health hazards since the present invention, which has a MSDS rating of 1, contains no hydrocarbons or hazardous materials. Due to the fact that the present invention utilizes a water soluble liquid base and/or continuous phase, recovery of the abrasive particles after use of the abrasive composition is enhanced. The present invention also results in a more efficient abrasive composition which results in a savings of time and money.

SUMMARY OF THE INVENTION

The invention is directed to an abrasive composition comprising: from about 5% to about 94% water; from about 5% to about 94% polyhydric alcohol; from about 0.00075% to 0.5% surfactant; from about 0.0015% to about 1% polymer; and from about 0.001% to about 50% abrasives.

The invention is also directed to an abrasive composition comprising: from about 40% to about 79% by weight water; from about 20% to about 59% by weight polyhydric alcohol; from about 0.0015% to about 0.25% by weight surfactant; from about 0.005% to about 0.2% by weight polymer; and from about 0.005% to about 30% by weight abrasives.

The invention is further directed to a liquid base component for an abrasive composition comprising: from about 5% to about 94% by weight water; from about 5% to about 94% by weight polyhydric alcohol; and from about 0.0015% to about 1% by weight polymer.

Moreover, the invention is directed to a method of making an abrasive composition having an abrasive component and a liquid base component comprising: (a) preparation of the abrasive component by (i) mixing abrasives with a caustic solution to form a mixture; (ii) heating the mixture; (iii) adjusting the pH to about 7; (iv) adding a polymeric acid salt to the mixture; (v) adding a surfactant in a sufficient amount to adjust the pH of the mixture to about 7; (b) preparation of the liquid base component by mixing a polymer with a polyhydric alcohol solution; and (c) mixing the abrasive and liquid base components together to form the abrasive composition.

DETAILED DESCRIPTION OF THE INVENTION

The invention is directed to abrasive suspension systems or compositions for finishing processes including polishing and lapping. The present invention utilizes particles or abrasives durably suspended in a liquid base comprised of water, an alcohol, and a polymer.

In the practice of the present invention, any known abrasives and/or particles may be utilized as long as the abrasives and/or abrasive particles remain durably suspended in the liquid base of the present invention. For example, diamond, boron nitride, boron carbide, aluminum oxide, and silicon carbide abrasives may be used in the practice of the present invention. It has been found that generally diamonds are the preferred abrasive for use in the practice of the present invention. The present invention may be used with, e.g., diamonds having a diameter of 0.001 to 80 microns and/or a U.S. Sieve Series 20 to 400. Likewise, boron nitride and boron carbide particles having a diameter of 0.001 to 80 microns or U.S. Sieve Series 20 to 400 can also be used in the practice of the present invention.

In the practice of the present invention, the abrasives are suspended in a liquid base or continuous phase. The liquid base is preferably comprised of water, an alcohol, and a polymer. Preferably, the water of the liquid base is deionized and has a resistivity of at least 6 megohms and most preferably has a resistivity of at least 18 megohms.

The alcohol of the liquid base is preferably a polyhydric alcohol and includes glycerol and polyalkylene glycols such as ethylene glycol, propylene glycol, and bi- and tripropylene glycols.

The liquid base of the present invention also includes a polymer. Preferably, the polymer is an acrylic polymer selected from the group consisting of polymers or copolymers of acrylic acid, e.g., methacrylic acid, acrylic acid esters, methacrylic acid esters, or acrylonitrile. Preferably, the polymers useful in the practice of the present invention are crosslinked. It has been found that the acrylic polymer sold under the trade name "CARBOPOL EZ-1 RESIN" (Lot No. ZC054N4) manufactured and sold by the BFGoodrich Company's Specialty and Chemicals Division, is preferred when utilizing diamonds as the abrasive. The "CARBOPOL EZ-1 RESIN" is an acrylic polymer containing residual acrylic acid and powder/dust of polymer.

Generally, depending upon the application, the present invention comprises from about 0.001% to about 50% by weight abrasive particles, preferably diamonds, of the total abrasive composition. Preferably, the diamond particles comprise from about 0.01% to about 20% by weight of the abrasive composition of the present invention. The same is true when utilizing boron nitride, boron carbide, aluminum oxide or silicon carbide particles. Water comprises from about 5% to about 94% by weight of the abrasive composition of the present invention. Preferably, water comprises from about 40% to about 79% of the total abrasive material. The alcohol component of the present invention comprises from about 5% to about 94% by weight of the total abrasive composition and preferably comprises from about 20% to about 59% by weight when utilizing diamond particles. Generally, utilizing "CARBOPOL EZ-1 RESIN" the abrasive material of the present invention comprises from about 0.0015% to about 1% by weight polymer of the total abrasive composition. Preferably, the invention comprises from about 0.005% to about 0.2% by weight polymer of the total abrasive composition.

An abrasive composition of the invention can be made by preparing an abrasive component like a diamond abrasive mixture containing diamonds ranging from 0.001 microns to 80 microns and then mixing it into the liquid base of the invention. To prepare the abrasive component, one may select any volume of diamond abrasive and mix it with a caustic, such as sodium hydroxide, at a ratio of 1 part diamond abrasive to 5 parts caustic. An equal volume of water is then added, and the entire mixture is heated to boiling. After boiling for 15 minutes, the mixture is removed from the heat and allowed to cool. The mixture is then decanted and rinsed repeatedly until neutral pH is achieved. The resulting diamond mixture should not be dried. Once neutral pH is reached, deionized water, in an amount equal to 5% of the total volume of the desired abrasive composition, is added to the diamond mixture. For example, for 1 liter of abrasive composition, 50 ml of deionized water should be added. In order to eliminate the agglomeration and flocculation of particles that may otherwise occur in the abrasive composition, a surfactant/dispersant in an amount equal to 0.1% of the total weight of the desired abrasive composition to be produced is then added to the diamond mixture and mixed until thoroughly dispersed. In preparing the novel abrasive component of the present invention, a salt of a polymeric acid may be utilized, e.g., "Tamol 731N" (Lot No. 0044C36B) available from Rohm and Haas Company in Philadelphia, Penn., may be used. The "Tamol 731N" contains about 24–26% sodium salt of polymeric carboxylic acid, about 74–76% water, and less than 0.1% individual residual monomers. To complete preparation of the abrasive component, a surfactant in an amount equal to about 0.015% of the total amount of the desired abrasive composition, or in an amount necessary to bring the pH of the total abrasive component to 7, is added to the component. The preferred surfactant is an ethanolamine like triethanolamine but, monoethanolamine and diethanolamine may also be utilized. Upon reaching a pH of 7, the abrasive component is complete. Generally, ethanolamine is added in an amount from about 0.00075% to about 5% by weight of the total abrasive composition.

To prepare the liquid base component of the present invention, deionized water is mixed with an alcohol, like a polyhydric alcohol. Generally, water and alcohol are mixed at a ratio to achieve the desired lubricating qualities for the desired application. Then the polymer, such as "CARBOPOL EZ-1 RESIN" described above, in an amount from about 0.01% to about 0.15% of the total weight of desired abrasive composition to be produced is sprinkled evenly across the top of the liquid base component prepared thus far. At this point, the liquid base component with the polymer should represent the weight of desired abrasive composition to be produced less the weight of the prepared abrasive component. Once the polymer is saturated and has formed a clear gel, the liquid base component should be mixed at 60 rpm until the liquid base component is a homogeneous mixture.

Once both the abrasive component and the liquid base component are properly prepared, the abrasive component is washed into the liquid base component utilizing a deionized water spray. Once the resulting mixture has thickened, it should be mixed at approximately 200 rpm for approximately 2 minutes until completely blended. The material formed by this method results in a novel composition having abrasives durably suspended in a liquid water soluble base which meets all objects of the invention.

EXAMPLES

The following are examples of specific compositions of the present invention for (1) ceramic and (2) polycrystalline diamond lopping. However, the percentages of components change depending upon a number of variable factors including but not limited to: (1) pressure set of machine; (2) feed rate; (3) rpm of table; (4) finish requirements; (5) stock removal; (6) time of cycle; and (7) type of material processed, etc.

Example 1

Ceramic Lapping

A ceramic lapping composition of the present invention was made comprising 79.1% by weight water, 20% by weight polyhydric alcohol, 0.03% by weight diamond particles ranging from 20 to 28 microns in diameter, 0.03% by weight of a 50% solution of triethanolamine, and 0.03% by weight acrylic polymer.

Example 2

Polycrystalline Diamond Lapping

A polycrystalline diamond lapping composition of the present invention was made comprising 29.82% by weight water, 50% by weight polyhydric alcohol, 20% by weight diamond (100–170 U.S. Sieve), 0.03% by weight of a 50% solution of triethanolamine, and 0.15% by weight acrylic polymer.

While the present invention has been described with reference to preferred embodiments, various modifications known to those skilled in the art, may be made without departing from the invention as recited in the several claims appended hereto.

We claim:
1. An abrasive composition consisting essentially of:
from about 5% to about 94% deionized water;
from about 5% to about 94% polyhydric alcohol;
from about 0.00075% to about 0.5% of surfactant;
from about 0.0015% to about 1% polymer; and
from about 0.001% to about 50% abrasives.

2. An abrasive composition as recited in claim 1 wherein said water has a resistivity of at least 6 megohms.

3. An abrasive composition as recited in claim 1 wherein said alcohol is selected from the group consisting of glycerol, ethylene glycol or propylene glycol.

4. An abrasive composition as recited in claim 1 wherein said surfactant comprises ethanolamine.

5. An abrasive composition as recited in claim 1 wherein said abrasives are selected from the group consisting of diamond, boron nitride, boron carbide, aluminum oxide, and silicon carbide.

6. An abrasive composition as recited in claim 1 wherein the polymer is an acrylic polymer.

7. An abrasive composition as recited in claim 1 wherein the polymer is crosslinked.

8. An abrasive composition consisting essentially of: from about 40% to about 79% by weight deionized water; from about 20% to about 59% by polyhydric alcohol; from about 0.0015% to about 0.025% by weight surfactant; from about 0.005% to about 0.2% by weight acrylic polymer; and from about 0.005% to about 30% by weight abrasives.

9. An abrasive composition as recited in claim 8 wherein said water has a resistivity of at least 18 megohms.

10. An abrasive composition as recited in claim 8 wherein said polyhydric alcohol is a polyalkylene glycol.

11. An abrasive composition as recited in claim 8 wherein said abrasives are selected from the group consisting of diamond, boron nitride, boron carbide, aluminum oxide, and silicon carbide.

12. An abrasive composition as recited in claim 8 wherein the polymer is crosslinked.

13. A method of making an abrasive composition having an abrasive component and a liquid base component comprising:

(a) preparation of the abrasive component by
 (i) mixing abrasive particles with a caustic solution to form a mixture;
 (ii) optionally heating the mixture;
 (iii) adjusting the pH to about 7;
 (iv) adding a polymeric acid salt to the mixture;
 (v) adding a surfactant in a sufficient amount to adjust the pH of the mixture to about 7;

(b) preparation of the liquid base component by mixing a polymer with a polyhydric alcohol solution; and (c) mixing the abrasive and liquid base components together to form the abrasive composition.

14. The method of claim 13 wherein the surfactant is ethanolamine.

15. The method of claim 14 wherein the polymer is acrylic polymer.

* * * * *